May 27, 1930.   N. H. MANN   1,760,156
MOTION PICTURE PHOTOGRAPHY
Filed June 18, 1927   3 Sheets-Sheet 1
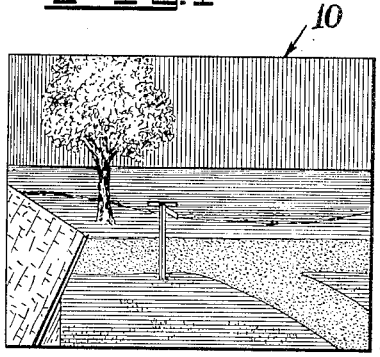
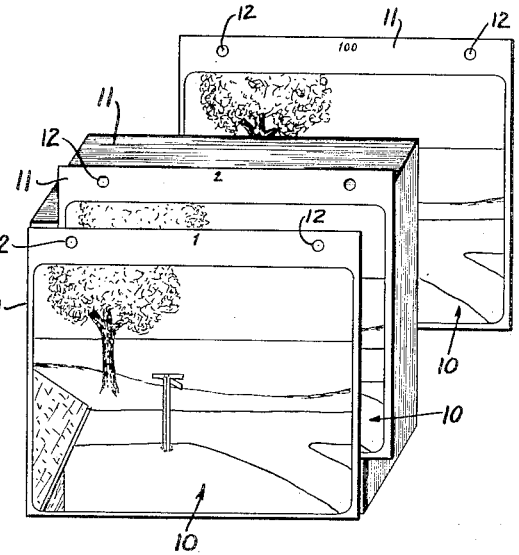
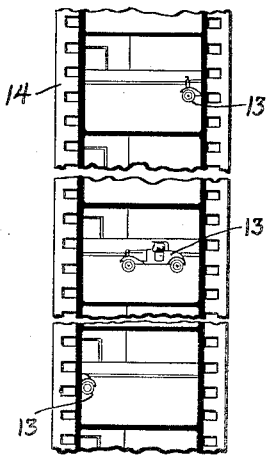
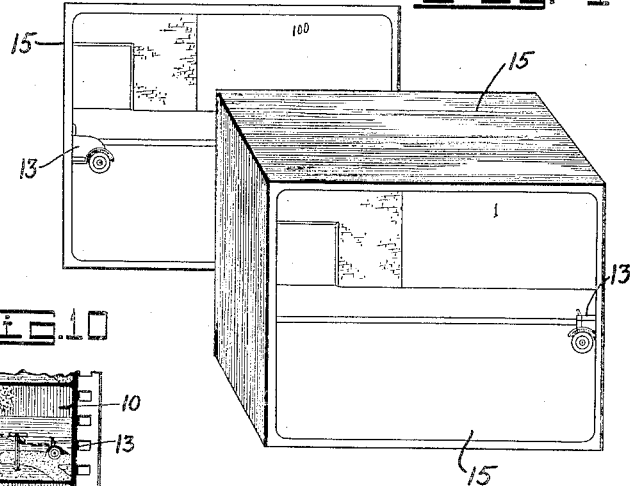
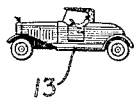
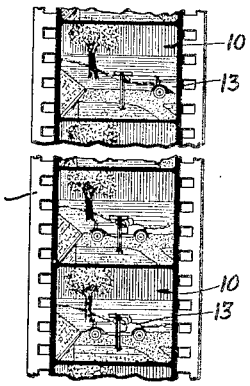
INVENTOR.
N. H. MANN
BY
ATTORNEY.

May 27, 1930. N. H. MANN 1,760,156
MOTION PICTURE PHOTOGRAPHY
Filed June 18, 1927 3 Sheets-Sheet 2
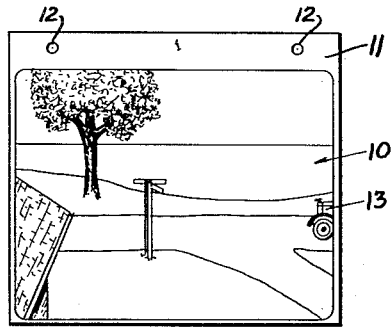
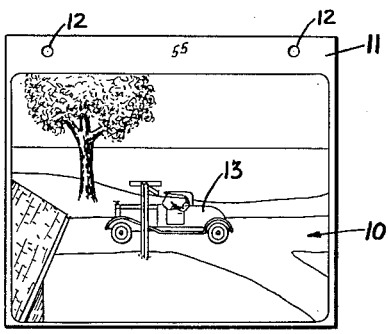
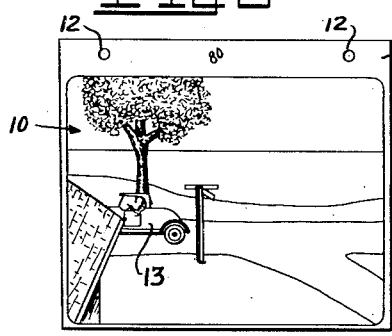
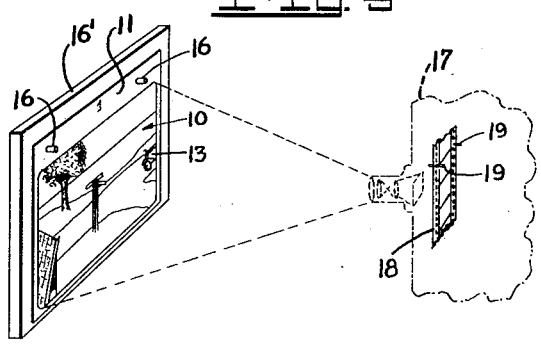
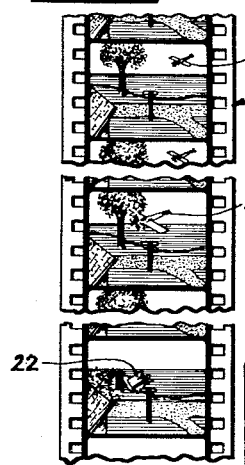
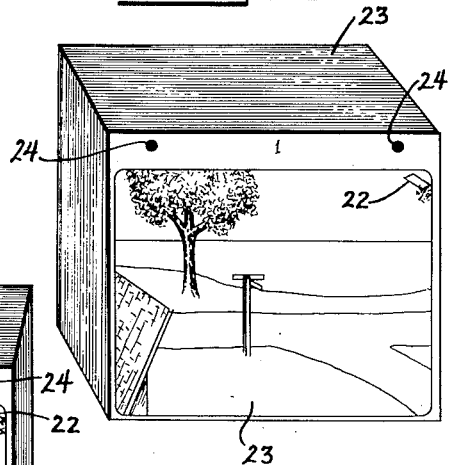
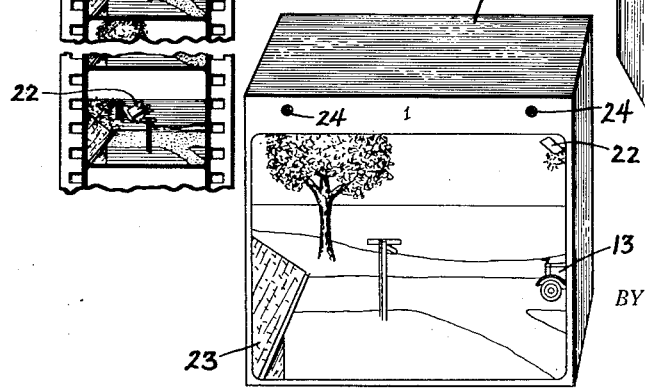
INVENTOR.
N. H. MANN
BY
ATTORNEY.

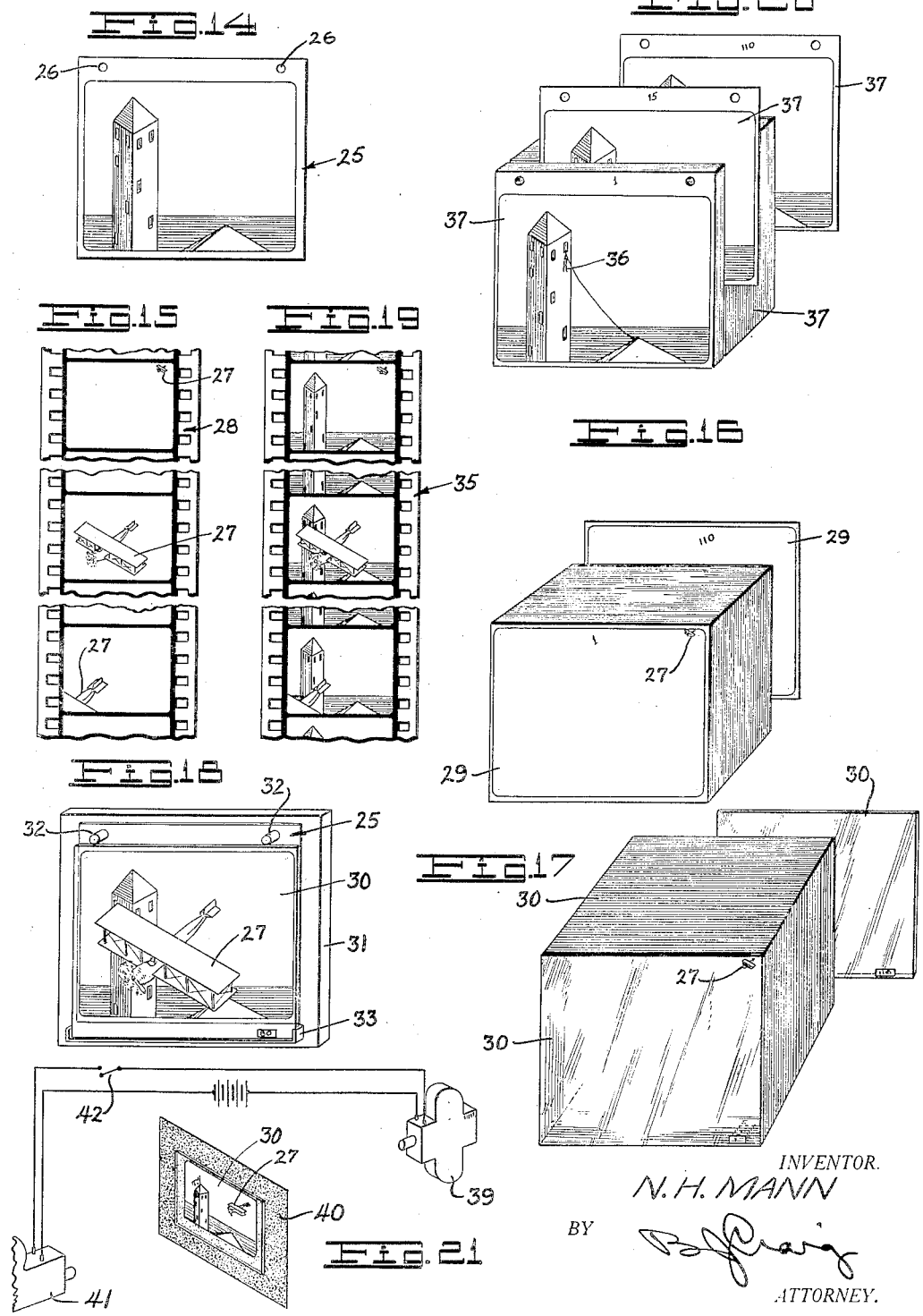

Patented May 27, 1930

1,760,156

UNITED STATES PATENT OFFICE

NED HERBERT MANN, OF LOS ANGELES, CALIFORNIA

MOTION-PICTURE PHOTOGRAPHY

Application filed June 18, 1927. Serial No. 199,763.

My invention relates to the art of producing composite motion pictures.

The general object of this invention is to provide action pictures by combining elements which may be photographed at different times and in different places into one film wherein the different elements will appear to have been photographed simultaneously.

Another object of my invention is to provide a method of compositing a motion picture photographed action figure upon a drawn or still picture background in such a manner as to produce a motion picture film wherein the action figure appears to have been actually photographed simultaneously with the background.

A further object of my invention is to provide an improved motion picture film made by combining action pictures with still pictures.

An additional object of my invention is to provide a composite film made by combining an action background with an action character separately made.

Other objects and advantages of my invention will be apparent from the following description taken in connection with the accompanying drawings wherein:

Fig. 1 is a face view of a "still" picture or drawn background such as may be used in connection with my invention.

Fig. 2 is a perspective view of a series of the backgrounds shown in Fig. 1, showing the same as having been photographed and reproduced upon cards ready for use.

Fig. 3 is a face view of a fragment of motion picture film having thereon an action figure.

Fig. 4 is a perspective view of a series of cards upon which each frame of the action figure film has been reproduced on an enlarged scale.

Fig. 5 is a view of the action figure after it has been cut out.

Figs. 6, 7, and 8 show the action figure pasted upon the backgrounds in various positions.

Fig. 9 shows the method of photographing the composite "stills" upon a motion picture film.

Fig. 10 is a face view of a fragment of the completed composite motion picture.

Fig. 11 is a face view of a fragment of motion picture film having a scene thereon to be used as a background.

Fig. 12 is a perspective view of a series of cards upon which each frame of the film shown in Fig. 11 has been reproduced on an enlarged scale.

Fig. 13 is a perspective view of the series of cards shown in Fig. 12 showing the cut out action figure shown in Fig. 5 as having been pasted thereupon.

Fig. 14 is a face view of another "still" picture or drawn background.

Fig. 15 is a face view of a fragment of motion picture film having thereon an action figure to be used in connection with the backgrounds shown in Fig. 14.

Fig. 16 is a perspective view of a series of cards upon which each frame of the action figure film shown in Fig. 15 has been printed on an enlarged scale.

Fig. 17 is a perspective view of a series of plates of glass upon which the action figures shown in Fig. 16 have been pasted after having been cut out.

Fig. 18 shows the manner of combining the backgrounds shown in Fig. 15 and the action figures shown in Fig. 17.

Fig. 19 is a face view of a fragment of the completed composite motion picture film.

Fig. 20 is a perspective view of a series of background cards having an action figure thereon to be used in combination with the glass plates shown in Fig. 17.

Fig. 21 is a diagrammatic view showing the method of compositing the action figures shown in Fig. 18 upon a projected motion picture.

In the production of motion pictures great expense is often incurred in producing certain scenes which include characters or background of unusual type or size or in scenes where certain actors must perform before backgrounds which are far removed from the studio. With my invention the background may be a "still" picture and the actors can perform before any kind of background. The action film is then composited with the "still" background to make a completed motion picture film whereupon it appears that the actors and the background were actually photographed simultaneously. This saves the expense of transporting the actors to the desired background or of building a life size set for the background. A great saving of time is also effected as the background may be "shot" when convenient and without interference by weather or seasonal conditions.

Also with my invention the background may be photographed upon a motion picture film and then each frame of the background film treated as a "still" and composited with the action film upon which the actors appear as will be more fully explained hereinafter.

My improved method of composite film photography is also particularly adapted for producing freak or trick effects and for producing scenes wherein apparently the actors are in great danger without actually subjecting the actors to any danger whatsoever.

Where I employ the term "action figure" in the specification and claims, it is to be understood that I have reference to a real object, animate or inanimate in natural action and not to a drawing or a puppet which is animated by artificial means.

In Figs. 1 to 10 inclusive I have shown my method of producing a composite film upon a "still" background indicated generally at 10. This background 10 as shown in Fig. 1 may be originally either a frame from a film, a "still" photograph or a drawing of the desired scene. The background 10 is then photographed and printed or otherwise reproduced upon a series of background cards 11 as shown in Fig. 2. The number of background cards 11 that are required is determined by the number of frames required to make the complete "shot." For instance if it required one hundred frames in the completed film to make the "shot", a corresponding number of background cards 11 would be required.

The background cards 11 are all provided with gauge holes 12 which are all in exactly the same relationship to the background 10 upon each card and the cards 11 are each consecutively numbered as shown in Fig. 2 from 1 to 100 inclusive.

As shown in Fig 3 the action figure (which in this instance is an automobile) indicated at 13, is photographed upon a motion picture film 14 against any kind of background. Each frame of the film 14 is then printed or reproduced on a card 15 as shown in Fig. 4 on a scale to match the background 10. The number of frames required to make the completed shot in this instance being one hundred the cards 15 are numbered from 1 to 100 inclusive beginning with the card whereupon the action figure 13 first enters the scene.

The action figure 13 is then cut out from each of the cards 15 as shown in Fig. 5 and a number corresponding to the number of the card from which it was cut is preferably placed on the back of the cut out action figure 13. The cut out action figures 13 are then pasted in the correct position on the background cards 11 which bear numbers corresponding to the numbers on the backs of the action figures 13 (see Figs. 6, 7 and 8).

In Fig. 6 the action figure 13 is shown as just entering the scene and in Fig. 7 the action figure 13 is shown as passing behind a sign post in about the center of the scene. As in Figs. 7 and 8 when the action figure 13 is supposed to appear to pass behind an object, the portion of the action figure which is apparently obstructed from view is cut away and the remaining portion or portions correctly pasted on the background card.

After the action figures 13 have been placed on the background cards 11 the background cards are placed on gauge pins 16 on a support 16' which pass through the gauge holes 12 in the cards as shown in Fig. 9. A camera, indicated in dotted lines at 17 in Fig. 9, is then focused on the cards 11. The camera 17 is adapted to receive a negative motion picture film 18 which is fed behind the lens of the camera intermittently. In photographing the cards 11 the film 18 is exposed one frame at a time until all of the cards 11 from the first to the last have been photographed upon separate frames consecutively.

To accurately position each frame of the film 18 gauge pins 19 may be provided in the camera which are adapted to pass through the same perforations in the film adjacent each frame. By placing the cards 11 upon the gauge pins 16 and by stopping the film 18 on the gauge pins 19 it will be readily seen that each scene 10 will be photographed on each frame of the film 18 in exactly the same position.

In Fig. 10 I have shown a face view of a fragment of completed positive film 20 which has been produced by my improved method of composite photography which has just been described in the foregoing paragraphs. When this film 20 is projected upon a screen it appears as though the background and the action figure were actually photographed simultaneously.

In Figs. 11, 12 and 13 I have shown the manner in which a motion picture background may be used in combination with a cut out figure. In Fig. 11 I have shown a fragment of motion picture film 21 of the scene to be used for a background. When using a background which has been photographed by a motion picture camera action may also take place in the background as shown by the aeroplane indicated at 22. Each frame of the film 21 is then printed upon a card 23 on an enlarged scale as shown in Fig. 12 and thereafter treated as a "still" picture.

As previously explained in connection with the background cards 11 there will be the same number of cards 23 as there are frames required to make the completed "shot", each card being provided with gauge holes 24 similar to the gauge holes 12 in the cards 11. After each frame has been enlarged upon the cards 23 the desired action figure or figures are pasted upon the cards as previously described in connection with the Figs. 4 to 8 inclusive. In Fig. 13 I have shown the action figure as being the automobile 13 shown in Fig. 5. After the action figure has been pasted upon the cards 23 each of the cards are then photographed upon a frame of a motion picture film as previously explained in connection with Fig. 9.

Although I have described only one cut out action figure as being incorporated in a scene it will be understood that as many cut out action figures as desired may be included in a scene. For instance the aeroplane 22 in Fig. 11 might be photographed separately, enlarged, cut out and pasted upon a background which was originally a "still" picture or drawn as previously explained in connection with the automobile 13.

In Figs. 14 to 19 inclusive I have shown another method wherein a cut out action figure is composited with a drawn or "still" picture background to produce a complete motion picture "shot".

In Fig. 14 I have shown a drawn or "still" picture background which has been reproduced upon a card 25 which is provided with gauge holes 26 similar to the gauge holes in the previously mentioned cards 11 and 23. The action figure which is to be combined with the background on the card 25 is shown as an aeroplane indicated at 27 on a fragment of motion picture film 28 in Fig. 15. As previously explained in connection with the action figure 13 in Fig. 5 the aeroplane 27 is printed upon a series of cards 29 (see Fig. 16) the number of cards 29 corresponding to the number of frames required to make the completed motion picture film of this particular "shot". Each action figure 27 is then cut out from the cards 29 and pasted upon individual numbered plates of transparent glass 30 as shown in Fig. 17. The action figures 27 are so arranged that the proper movement takes place in passing from one plate to another. The background card 25 is then placed on a support 31 having thereon gauge pins 32 which match with the gauge holes 26 in the card 25 and pass therethrough to correctly position the card 25 (see Fig. 18). The glass plates 30 having thereon the cut out action figure 27 are then placed one at a time from the first to the last, over the background card 25. The support 31 is also provided with a suitable gauge 33 for the plates 30 to correctly position each plate 30 in exactly the same relationship to the background card 25. Each time a different plate 30 is placed over the background card 25 the combination is photographed upon a frame of a negative motion picture film as previously explained in connection with Fig. 9.

In Fig. 19 I have shown a fragment of positive motion picture film 35 which has been produced by the use of the "still" picture background 25 and the glass plate 30.

It will be noted that when the glass plates 30 having the action figure thereon are used only one copy of the background is necessary when there is no action taking place in the background.

When action is to take place in conjunction with the background as shown by the man indicated at 36 on the background cards 37 in Fig. 20, it is necessary that a series of background cards 37 be provided corresponding in number to the number of frames required to make the completed "shot." T action figure 36 may be either a "cut out pasted thereon as previously explained or the background and the action figure may be first photographed on a motion picture film and then each frame of the film printed upon the cards 37 on an enlarged scale as previously explained in connection with Fig. 11.

In Fig. 21 I have shown another method of combining the action figure 27 on the glass plates 30 with a background taken by a motion picture camera. In this instance a positive motion picture film is printed from the negative film and projected one frame at a time by a specially constructed motion picture projecting machine 39 upon a light transmitting screen 40 such as frosted celluloid. The glass plates 30 are positioned one at a time, from the first to the last, over the projected background on the side of the screen 40 opposite to the projecting machine 39. Then as each frame of the background is projected upon the screen 40 the corresponding glass plate 30 is placed over the background. The combination is then photographed by a special motion picture camera 41 upon a motion picture film, one frame at a time, until all the frames required for the "shot" have been taken.

As shown in Fig. 21 the projecting machine 39 and the camera 41 are electrically operated and wired in series so that when the circuit is completed by the switch 42, the projecting machine will move the positive motion picture film therein one frame and project that frame upon the screen 40 and at the same instant the camera 41 will move the negative motion picture film therein one frame and photograph the combination of the projected background and the action figure upon the glass plate 21. Suitable means would of course be provided for lighting the action figure 27 on the glass plate 30.

The projector 39 and the camera 41 may be synchronized electrically as shown in Fig. 21 or by an arrangement of mechanical elements but I do not deem it necessary to here go into the details of construction of the various mechanical elements.

It will also be understood that although I have shown and explained the action figures as being first photographed upon a motion picture film, they may be, if desired, animated drawings, wax figures or other types of animation.

From the foregoing description it will be apparent that I have provided a novel, simple and efficient method of producing composite motion picture films which will greatly reduce the expense of producing elaborate or freak "shots" and at times remove the hazards of producing certain difficult "shots" in the film.

Having thus described my invention, what I claim is:

1. The method of producing composite motion pictures which consist in reproducing a given scene upon a series of cards, then photographing a figure in real action upon a motion picture film, reproducing each frame of said motion picture film upon a card on a scale to match with said scene, cutting out said action figure, then placing said action figure in the correct position on said scene cards, and then photographing said cards consecutively upon individual frames of a motion picture film.

2. The method of producing composite motion pictures which consists in photographing a given scene upon a motion picture film, reproducing each frame of said scene film upon individual cards on an enlarged scale, then photographing on a motion picture film an action figure, reproducing each frame of said action film upon individual cards on a scale to match the scale of said scene, cutting out the action figures from said individual cards, then placing said action figures in the correct position on each of said scene cards and then photographing said cards consecutively upon individual frames of a motion picture film.

3. For use in motion picture photography a set of cards each having a given positive scene thereon, each card having a separately photographed positive view of a figure in real action secured thereto, said figure being in various active positions upon individual cards and on a scale to match the scale of said scene.

In testimony whereof, I hereunto affix my signature.

NED HERBERT MANN.